United States Patent
Hadar et al.

(10) Patent No.: US 11,239,793 B2
(45) Date of Patent: Feb. 1, 2022

(54) SYSTEMS AND METHODS TO REDUCE FIELD BUILDUP BETWEEN CELLS AND GLASS AND FRAME ASSEMBLY FOR SOLAR ENERGY PRODUCTION

(71) Applicant: Tigo Energy, Inc., Los Gatos, CA (US)

(72) Inventors: Ron Hadar, Capitola, CA (US); Shmuel Arditi, Discovery Bay, CA (US); Dan Kikinis, Los Altos, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 0 days.

(21) Appl. No.: 15/996,370

(22) Filed: Jun. 1, 2018

(65) Prior Publication Data
US 2018/0278205 A1  Sep. 27, 2018

Related U.S. Application Data

(60) Division of application No. 15/057,955, filed on Mar. 1, 2016, now Pat. No. 9,991,842, which is a continuation of application No. 12/628,997, filed on Dec. 1, 2009, now Pat. No. 9,312,697.

(60) Provisional application No. 61/273,209, filed on Jul. 30, 2009.

(51) Int. Cl.
*H02S 40/34* (2014.01)
*H02J 3/38* (2006.01)
*H05F 3/02* (2006.01)

(52) U.S. Cl.
CPC .............. *H02S 40/34* (2014.12); *H02J 3/383* (2013.01); *H05F 3/02* (2013.01); *Y02E 10/56* (2013.01)

(58) Field of Classification Search
None
See application file for complete search history.

(56) References Cited

U.S. PATENT DOCUMENTS

| | | | |
|---|---|---|---|
| 5,235,266 A | 8/1993 | Schaffrin | |
| 5,268,832 A | 12/1993 | Kandatsu | |
| 5,394,075 A | 2/1995 | Ahrens et al. | |
| 5,604,430 A | 2/1997 | Decker et al. | |
| 5,923,158 A | 7/1999 | Kurokami et al. | |
| 6,275,016 B1 | 8/2001 | Ivanov | |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

(Continued)

*Primary Examiner* — Shannon M Gardner
(74) *Attorney, Agent, or Firm* — Greenberg Traurig (57) ABSTRACT

Systems and methods for removing charge buildup/leakage from solar modules. A discharge controller may be coupled between a solar module and a string bus of a solar array. The discharge controller is configured to disconnect the solar module from the string bus, and to connect a grounded frame to solar cells of the solar module. Since the grounded frame of the solar module is grounded, connecting the grounded frame and the solar cells allows charge buildup/leakage to discharge into ground.

12 Claims, 7 Drawing Sheets

(56) References Cited

U.S. PATENT DOCUMENTS

| | | | |
|---|---|---|---|
| 6,448,489 | B2 | 9/2002 | Kimura et al. |
| 6,509,712 | B1* | 1/2003 | Landis ................... H02J 7/35 320/101 |
| 6,593,520 | B2 | 7/2003 | Kondo et al. |
| 6,650,031 | B1 | 11/2003 | Goldack |
| 6,844,739 | B2 | 1/2005 | Kasai et al. |
| 6,894,911 | B2 | 5/2005 | Telefus et al. |
| 6,984,970 | B2 | 1/2006 | Capel |
| 7,061,214 | B2 | 6/2006 | Mayega et al. |
| 7,248,946 | B2 | 7/2007 | Bashaw et al. |
| 7,256,566 | B2 | 8/2007 | Bhavaraju et al. |
| 7,276,886 | B2 | 10/2007 | Kinder et al. |
| 7,518,346 | B2 | 4/2009 | Prexl et al. |
| 7,554,031 | B2 | 6/2009 | Swanson et al. |
| 7,595,616 | B2 | 9/2009 | Prexl et al. |
| 7,605,498 | B2 | 10/2009 | Ledenev et al. |
| 7,719,140 | B2 | 5/2010 | Ledenev et al. |
| 9,312,697 | B2 | 4/2016 | Hadar et al. |
| 9,991,842 | B2 | 6/2018 | Hadar et al. |
| 2001/0050102 | A1 | 12/2001 | Matsumi et al. |
| 2004/0123894 | A1* | 7/2004 | Erban ............... H01L 31/02021 136/244 |
| 2005/0057214 | A1 | 3/2005 | Matan |
| 2005/0057215 | A1 | 3/2005 | Matan |
| 2006/0001406 | A1 | 1/2006 | Matan |
| 2006/0174939 | A1 | 8/2006 | Matan |
| 2006/0185727 | A1 | 8/2006 | Matan |
| 2007/0273351 | A1 | 11/2007 | Matan |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0203966 | A1 | 8/2008 | Ward |
| 2008/0224652 | A1 | 9/2008 | Zhu et al. |
| 2008/0264470 | A1* | 10/2008 | Masuda ................. F24S 25/15 136/251 |
| 2008/0303503 | A1 | 12/2008 | Wolfs |
| 2009/0101191 | A1 | 4/2009 | Beck et al. |
| 2010/0139743 | A1 | 6/2010 | Hadar et al. |
| 2016/0181973 | A1 | 6/2016 | Hadar et al. |

FOREIGN PATENT DOCUMENTS

| | | |
|---|---|---|
| DE | 19961705 | 7/2001 |
| EP | 1388774 | 2/2004 |
| ES | 2249147 | 3/2006 |
| WO | 2003012569 | 2/2003 |
| WO | 2009020917 | 2/2009 |

OTHER PUBLICATIONS

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronics, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application No. PCT/US2010/029936, International Search Report and Written Opinion, dated Nov. 12, 2010.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Eurosun 96, pp. 819-824, Sep. 16, 1996.

Roman, Eduardo, et al., "Intelligent PV Module for Grid-Connected PV Systems," IEEE Transactions on Industrial Electronics, vol. 53, No. 4, pp. 1066-1073, Aug. 2006.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Walker, Geoffrey R. et al., "Cascaded DC-DC Converter Connection of Photovoltaic Modules," IEEE Transactions an Power Electronics, vol. 19, No. 4, pp. 1130-1139, Jul. 2004.

* cited by examiner

SYSTEMS AND METHODS TO REDUCE FIELD BUILDUP BETWEEN CELLS AND GLASS AND FRAME ASSEMBLY FOR SOLAR ENERGY PRODUCTION

RELATED APPLICATIONS

The present application is a divisional application of U.S. patent application Ser. No. 15/057,955, filed on Mar. 1, 2016 and issued as U.S. Pat. No. 9,991,842 on Jun. 5, 2018, which is a continuation application of U.S. patent application Ser. No. 12/628,997, filed Dec. 1, 2009 and issued as U.S. Pat. No. 9,312,697 on Apr. 12, 2016, which claims the benefit of the filing date of Prov. U.S. application Ser. Ser. No. 61/273,209, filed Jul. 30, 2009 and entitled "Novel System and Method for Addressing Solar Energy Production Capacity Loss due to Field Buildup between Cells and Glass and Frame Assembly," the entire disclosures of which applications are hereby incorporated herein by reference.

FIELD OF THE TECHNOLOGY

At least some embodiments of the disclosure relate to photovoltaic systems in general, and more particularly but not limited to, improving the energy production performance of photovoltaic systems.

BACKGROUND

Charge often builds up between the glass (transparent) portion of a frame of a solar module and the solar cells protected by the glass. Alternatively, charges can leak into the solar cells. Both effects, charge buildup and charge leakage ("charge buildup/leakage"), may diminish photon absorption and electron transport, and thus decrease energy generation. To mitigate charge buildup/leakage, some manufacturers have suggested grounding either the plus or minus end of a string bus of solar modules. However, this solution may require an insulated frame due to the potential difference between the solar cells and ground. Additionally, it may be difficult to use transformerless inverters with this solution.

SUMMARY OF THE DESCRIPTION

Systems and methods in accordance with the present invention are described herein. Some embodiments are summarized in this section.

Charge buildup/leakage can be mitigated via the systems and methods herein disclosed. In one embodiment, a discharge controller may be coupled between a solar module and a string bus of a solar array. The discharge controller may be configured to disconnect the solar module from the string bus, and to connect the solar cells of the solar module to a grounded frame of the solar module. Connecting the solar cells to the grounded frame allows charge buildup/leakage to discharge into ground.

In an embodiment, a solar array may include one or more solar generation units. Each solar generation unit may include a solar module having solar cells and a grounded frame. The solar generation unit may also include a discharge controller. The discharge controller may be coupled between the solar module and a string bus of the solar array. The discharge controller may be configured to disconnect the solar cells of the solar module from the string bus, and to connect the solar cells of the solar module to the grounded frame of the solar module. Connecting the solar cells of the solar module to the grounded frame of the solar module is equivalent to grounding the solar cells of the solar module and thus allows charge buildup/leakage to discharge into ground. This process can be carried out for a short period of time (e.g., one millisecond) in order to minimize the time that the solar module is not providing energy to the string bus and thus the solar array. The discharge controller may have one or more switchable connections (e.g., double-pole double-throw relay and transistors) for connecting and disconnecting components that are connected to the discharge controller (e.g., the string bus, the solar cells of the solar module, and/or the grounded frame of the solar module, to name a few).

While shorting the solar cells and the grounded frame provides a route for the charge buildup/leakage to discharge into ground, such discharge may be slower than desired. Thus, in an embodiment, a voltage provider may be used to alter the voltage potential between the grounded frame and the solar cells. The voltage potential can be increased or a negative voltage potential can be created. An increased voltage potential increases the electric field pulling the charge buildup/leakage into the ground.

In another embodiment, a method includes three operations: (1) disconnecting a string bus from solar cells of a solar module; (2) connecting the solar cells of the solar module to a frame of the solar module; and (3) connecting the solar cells of the solar module to ground. In this embodiment, the frame of the solar module may not be grounded. However, it is also possible for the frame to be grounded.

In another embodiment, a discharge controller is described. The discharge controller may include a positive solar module terminal and a negative solar module terminal, both configured to connect to a solar module. The discharge controller also may include a positive string bus terminal and a negative string bus terminal, both configured to connect to a string bus. The discharge controller also may include a grounded frame terminal configured to connect to a grounded frame of the solar module. The discharge controller also may include a first switchable connection between the negative solar module terminal and the negative string bus terminal, the first switchable connection configured to: (1) disconnect the negative solar module terminal from the negative string bus terminal; and (2) connect the negative solar module terminal to the grounded frame terminal. The discharge controller also may include a second switchable connection between the positive solar module terminal and the positive string bus terminal, the second switchable connection configured to: (1) disconnect the positive solar module terminal from the positive string bus terminal; and (2) connect the positive solar module terminal to the grounded frame terminal.

Other embodiments and features of the present invention will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

To remove the charge buildup/leakage described in the background, charge buildup/leakage can be discharged or removed from the solar modules via the systems and methods herein disclosed. In one embodiment, a discharge controller may be coupled between a solar module and a string bus of a solar array. The discharge controller may be configured to disconnect the solar module from the string bus, and to connect the grounded frame and solar cells to each other. Connecting the solar cells and grounded frame allows charge buildup/leakage to discharge into ground. The discharge controller can have at least one or two switchable connections (e.g., double-pole double-throw relay or transistors). Discharge time can be minimized (e.g., one millisecond) and performed periodically (e.g., ten seconds) in order to minimize the time that the solar module is not providing energy to the string bus and thus the solar array. For example, if the solar modules are disconnected every ten seconds, and disconnected for ten milliseconds, the energy loss would only be one tenth of one percent. This loss is substantially less than what would be caused by charge buildup/leakage being allowed to buildup in the solar modules.

While shorting the solar cells and the grounded frame provides a route for the charge buildup/leakage to discharge into ground, such discharge may be slower than desired. Thus, in an embodiment, a voltage provider may be used to increase the voltage potential between the grounded frame and the solar cells. This increased voltage potential increases the electric field pulling the charge buildup/leakage out of the solar modules and into the ground. In another embodiment, the voltage provided may create a negative voltage potential between the grounded frame and the solar cells.

In an embodiment, the discharge controller connects to a solar cell via a positive and a negative pole of the solar module in which the solar cell is mounted. In an embodiment, the positive and negative poles of the string bus can be connected via a bypass circuit such that current continues to pass along the string bus even when the solar module is disconnected from the string bus.

Figure 1:
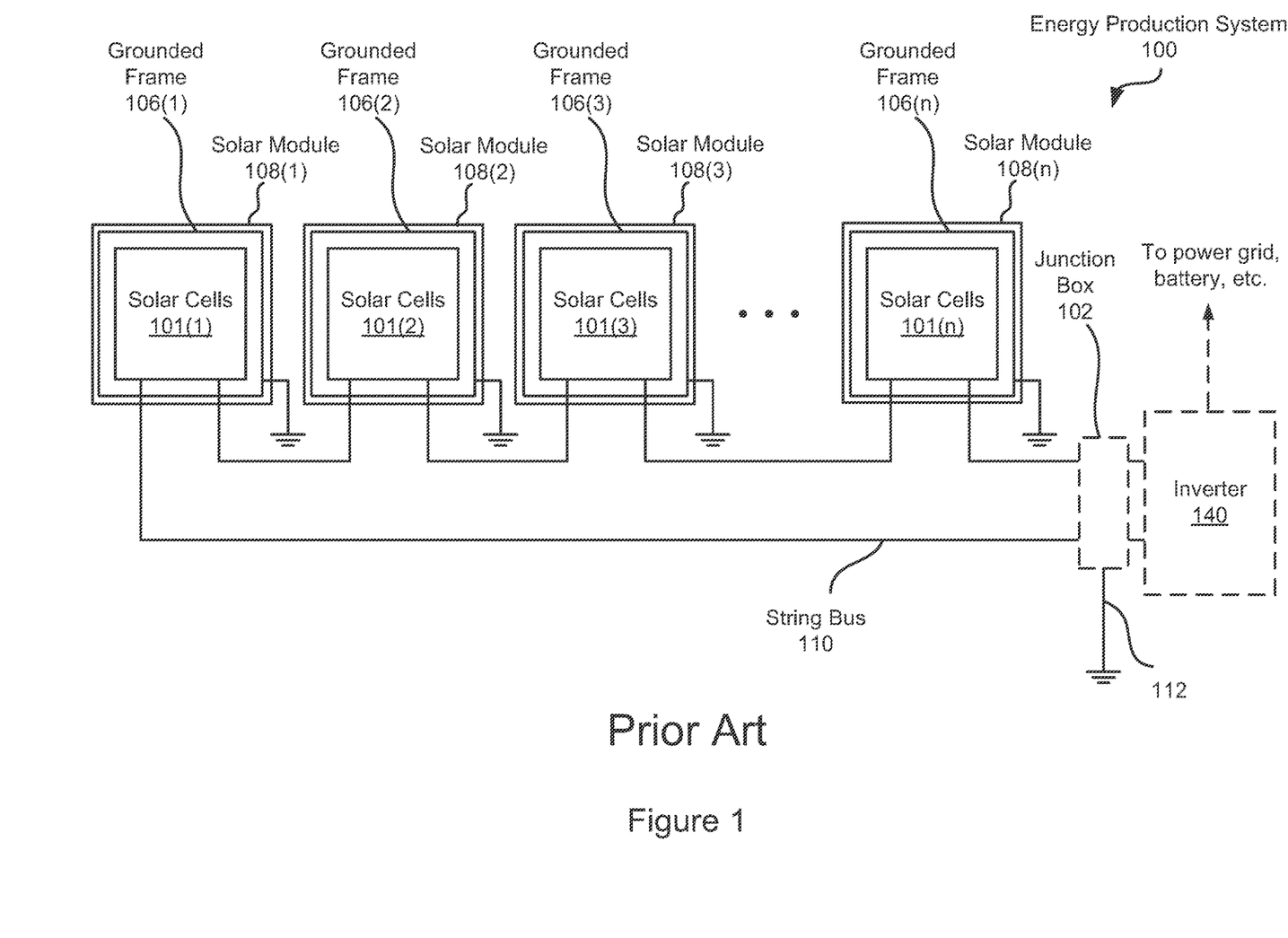
FIG. 1 illustrates an embodiment of a typical energy production system.

FIG. 1 illustrates an embodiment of an energy production system 100 known in the art. The energy production system 100 can include one or more solar modules 108. The system 100 has any number of solar modules 108(1), 108(2), 108(3), . . . , 108(n) ("108"). Each solar module 108 includes a grounded frame 106 and solar cells 101. Solar cells 101 can include one or more solar cells 101 per solar module 108. The solar modules 108 are connected in series via a string bus 110.

A positive and negative pole of the string bus 110 may pass through an optional junction box 102 (also known as a direct current separation box). The junction box 102 may be grounded via ground connection 116. The string bus 110 may further be connected to an inverter 140 external to the energy production system 100. The inverter 140 can connect to a power grid, one or more batteries, a residential or commercial power system, or any other load. The inverter 140 is configured to convert direct current (DC) energy from the string bus 110 into alternating current (AC) energy. The inverter 140 may include or be connected to a transformer (not illustrated) creating a galvanic separation or potential separation between the inverter's 140 input and output. This prevents a potential from forming between the solar modules 108 and the AC output of the inverter 140.

Figure 2:
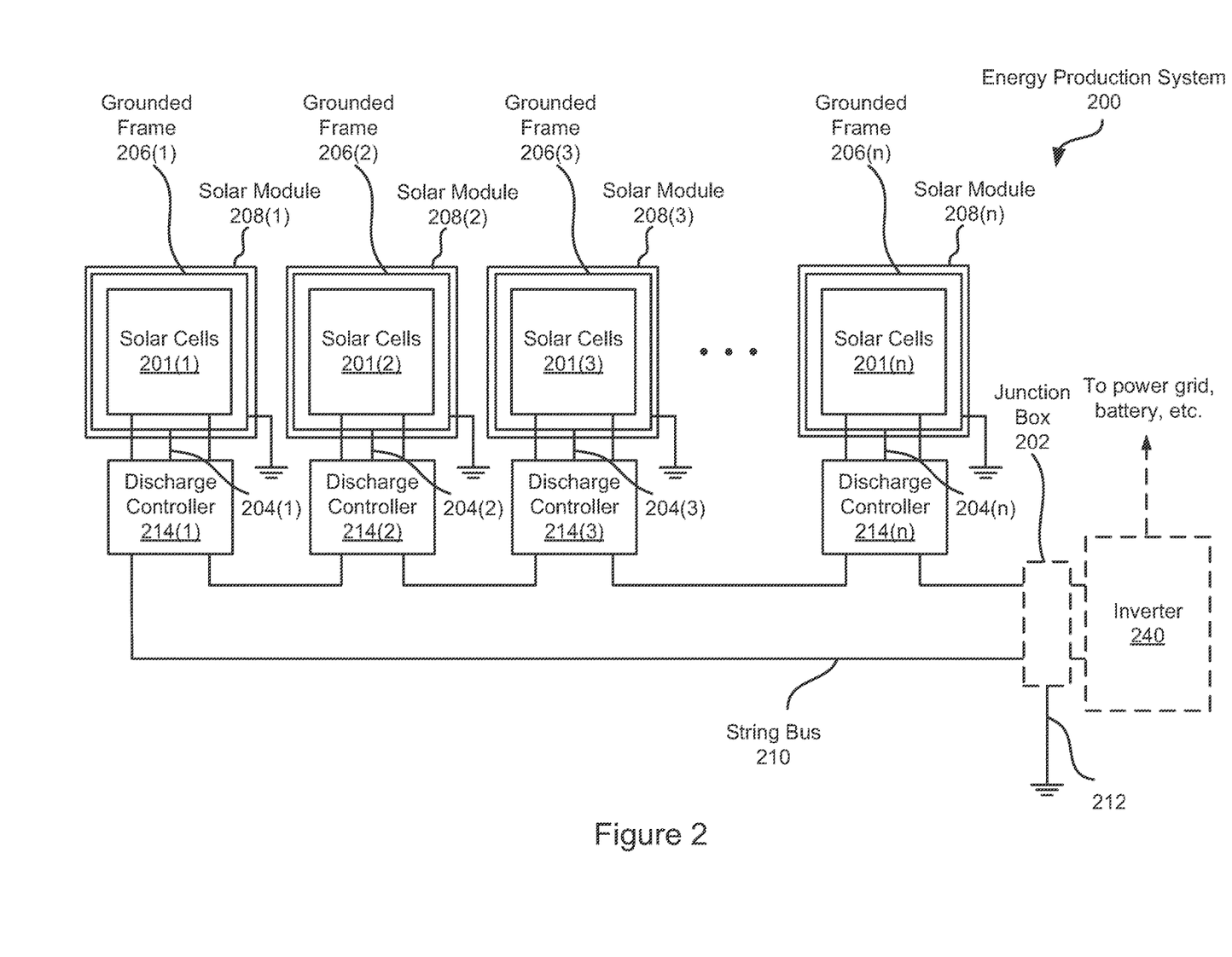
FIG. 2 illustrates an embodiment of the energy production system unique to this disclosure.

FIG. 2 illustrates an embodiment of the energy production system unique to this disclosure. Like the traditional energy production system 100, the energy production system 200 includes solar modules 208, each having a grounded frame 206 and one or more solar cells 201. The solar modules 208 are connected in series via a string bus 210. In an embodiment, the solar modules 208 may be connected in parallel via the string bus 210. The energy production system 200 may connect to a junction box 202 and/or an inverter 240.

Unlike the traditional energy production system 100, the energy production system 200 includes a discharge controller 214 coupled between each solar module 208 and the string bus 210. In an embodiment, the discharge controllers 214 may be coupled between less than all solar modules 208 and the string bus 210 (e.g., coupled between solar module 208(1) and the string bus 210 and between solar module 208(2) and the string bus 210). The discharge controllers 214 are configured to remove charge buildup/leakage from the solar modules 208. Charge buildup/leakage can be removed from one of the solar modules 208, by disconnecting that solar module 208 from the string bus 210, and connecting either the positive or negative pole of the solar module 208 to the grounded frame 206 of the solar module 208. Since the grounded frame 206 is grounded, the solar module pole that the grounded frame 206 is connected to will also be grounded. As such, charge buildup/leakage in the solar module 208 will be discharged into ground. Whether the positive or negative pole of the solar module 208 is connected to the grounded frame 206 depends on the polarity of the solar cells 201 of the solar module 208. Assuming the solar cells 201 comprise a p-type and an n-type side (or surface or portion), whichever side is closest to the direction of incident photons may be connected to the grounded frame 206.

Also, unlike traditional energy production systems, the inverter 240 can be transformerless, although this is not required. Government regulation often requires a ground fault interrupter (GFI) or an arc fault interrupter (AFI) in the junction box 202. However, for the purposes of this disclosure, these devices are optional.

A "grounded frame" 206 is a structure for supporting one or more solar cells 201 and a transparent portion. The grounded frame 206 is grounded. The grounded frame 206 can be rigid or flexible. The grounded frame 206 provides not only structural support for the solar cells 201, which can be brittle, but can also provides protection from particulate matter, weather, and human and inanimate impacts. The grounded frame 206 can wrap around a rim of the solar cells 201, and be open in a back of the solar cells 201. Alternatively the grounded frame 206 can envelope the back and sides of the solar cells 201 while leaving the front of the solar cells 201 open, where the transparent portion is located. The transparent portion also provides support and protection, but additionally allows photons of certain wavelengths (e.g., visible or 380 nm-750 nm) to efficiently reach the solar cells 201.

A "leaked charge" is one that has leaked into the semiconductor portion of the solar cells from the grounded frame or from some other source external to the solar cells. "Charge buildup" is an accumulation of charge on an outer surface of the transparent portion. For example, dust that comes to rest on the transparent portion can be charged, and thus dust accumulation can cause charge buildup. Numerous other causes of charge buildup also exist. A "solar cell" is a photovoltaic device configured to absorb photons and convert them into electrical energy. A "solar module" is a device that includes at least one or more solar cells, a grounded frame, and a transparent portion. A "solar generation unit" is a device that generates electrical energy from photons and includes a solar module and a discharge controller. The discharge controller may be coupled between the at least one solar module and a string bus. A "string bus" is a conductive path connecting one or more solar modules in series. In an embodiment, a string bus connects one or more solar modules in parallel. "Ground" is a conducting body, such as the earth or an object connected to the earth, having a voltage potential of zero.

Figure 3:
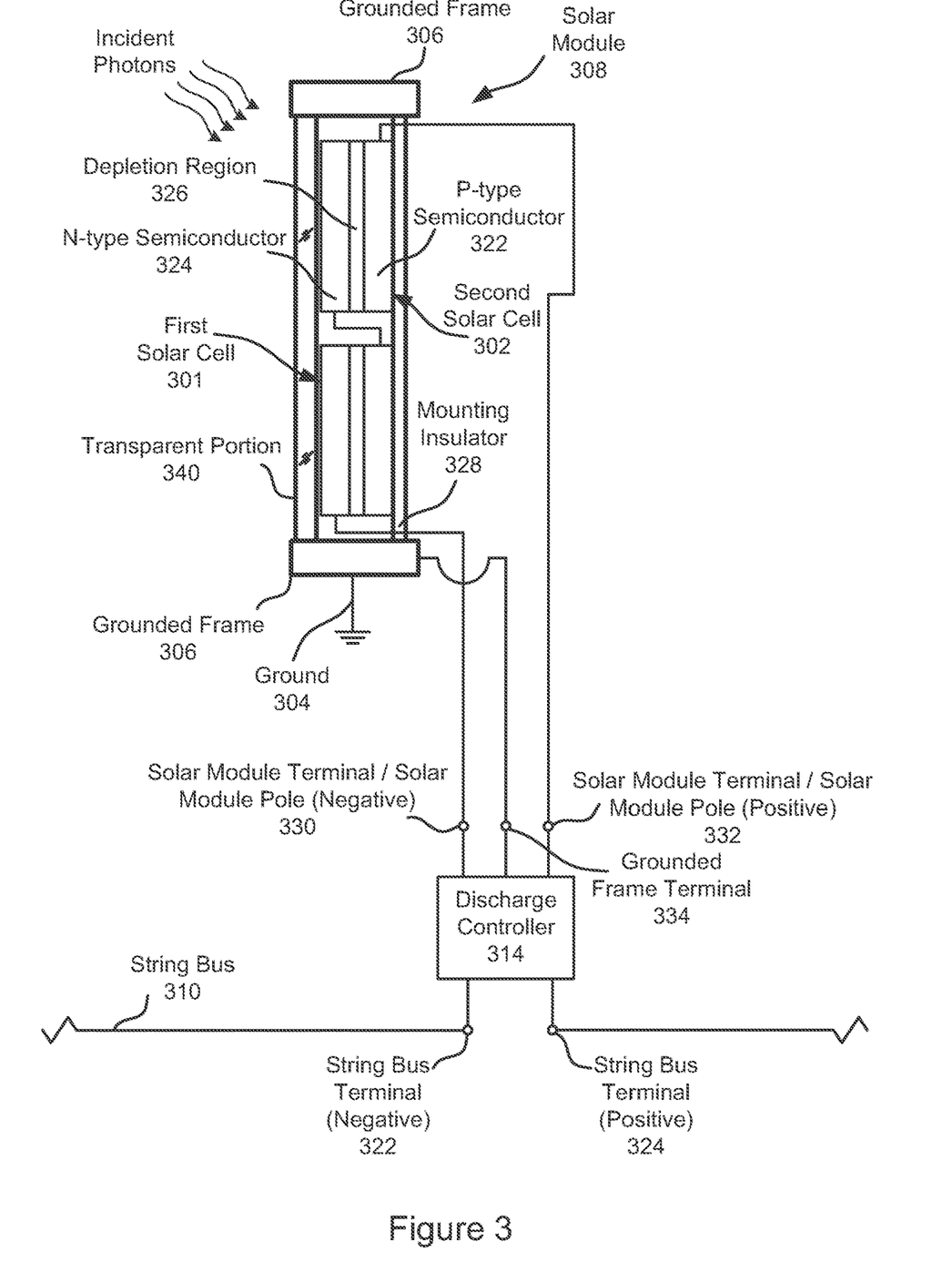
FIG. 3 illustrates an embodiment of a solar module (cross sectional view) connected to a string bus via a discharge controller.

FIG. 3 illustrates an embodiment of a solar module 308 (cross sectional view) connected to a string bus 310 via a discharge controller 314. The solar module 308 includes a grounded frame 306. Solar cells 301, 302 may be mounted on the grounded frame 306. In an embodiment, the solar cells 301, 302 may be separated from the grounded frame 306 via an insulator such as the illustrated mounting insulator 328. The poles of the solar module 330, 332 are connected to solar module terminals 330, 332 of the discharge controller 314. The discharge controller 314 is connected to the string bus 310 via two string bus terminals 322, 324.

The grounded frame 306 can support and protect the solar cells 301, 302. The grounded frame 306 can wrap around a rim of the solar cells 301, 302, and be open in a back of the solar cells 301, 302. In a non-illustrated embodiment, the grounded frame 306 can envelope the back and sides of the solar cells 301, 302 while the transparent portion 340 covers the front of the solar cells 301, 302. The grounded frame 306 can be made of a rigid material (e.g., metal) allowing the grounded frame 306 to structurally support the solar cells 301, 302. The grounded frame 306 is connected to ground 304.

The grounded frame 306 includes a transparent portion 340. The transparent portion 340 can support and protect the solar cells 301, 302, but additionally allows photons of certain wavelengths (e.g., visible or 380 nm-750 nm) to efficiently reach the solar cells 301, 302. The transparent portion 340 can be made of a variety of materials. The material selected may depend on the wavelengths of light that the solar cells 301, 302 are designed to absorb. For instance, for solar cells designed to absorb visible photons (380 nm-750 nm), the transparent portion 340 may be made with a material such as glass.

For the purposes of this disclosure, the phrase "charge buildup/leakage" will be used to describe both charge buildup on the outside of the transparent portion 340, and charge leakage into the solar cells 301, 302. In terms of charge buildup, the conductor-insulator-semiconductor sandwich created by the charges on the outside surface of the transparent portion 340 (conductor), the transparent portion 340 (insulator), and the solar cells 301, 302 (semiconductor), mimic a capacitor. It should be understood that when referring to charge buildup/leakage, this effect often involves the side of the solar cells 301, 302 (either the p-side or n-side) that is adjacent to the transparent portion 340 (also the side facing incident photons). In the illustrated embodiment, this is the n-type side of the solar cells 301, 302. The transparent portion 340 can be in contact with the solar cells 301, 302 or separated from them (as illustrated). Charge on the outside surface of the transparent portion 340 provides a conductive pathway to the rest of the grounded frame 306. The solar cells 301, 302 may be insulated from the grounded frame 306, for instance via a mounting insulator 328 or other means. The solar cells 301, 302 and the grounded frame 306 are thus conductively isolated. However, there may be a capacitive connection between the transparent portion 340 and the solar cells 301, 302.

In the illustrated embodiment, there are two solar cells: a first solar cell 301, and a second solar cell 302. The first solar cell 301 and the second solar cell 302 are connected in series. In another embodiment, the first solar cell 301 and the second solar cell 302 can be connected in parallel. Although only a first and second solar cell 301, 302 are illustrated, three or more solar cells can also be part of the solar module 308. Each solar cell 301, 302 comprises a p-n junction formed from an n-type semiconductor 324 and a p-type semiconductor 322 in contact with each other. When such a junction is formed, a depletion region 326 is formed. The depletion region 326 is an area of a solar cell where few or no charge carriers exist. The depletion region 326 is also an area of the solar cell 301, 302 where the most efficient photon-to-electricity generation occurs. The solar cells 301, 302 can be mounted on the grounded frame 306 via a mounting insulator 328, although this is not required. The mounting insulator 328 can provide structural support for the solar cells 301, 302 and/or can prevent a conductive path from being formed between the solar cells 301, 302 and the grounded frame 306. The mounting insulator 328 may comprise any insulating or non-conducting material. The mounting insulator may take any shape or size, and is not to be limited by the shape and size illustrated in FIG. 6. While the solar cells 301, 302 discussed and illustrated herein are formed from p-n junctions, the disclosed systems and methods also apply to solar cells made from other types of circuits (e.g., multijunction photovoltaic cells, to name one).

The solar cells 301, 302 connect to the string bus 310 via the discharge controller 314. In the illustrated embodiment, the second solar cell 302 has a lead connecting its p-type semiconductor 322 to a positive solar module pole 332. The positive solar module pole 332 is connected to a positive solar module terminal 332 of the discharge controller 314. Switchable connections within the discharge controller 314 can connect or disconnect a conductive path between the positive solar module terminal 332 and a positive string bus terminal 324. The positive string bus terminal can be connected to the string bus 310. Thus, the discharge controller 314 can control whether the p-type semiconductor 322 of the second solar cell 301 is connected to the string bus 310, the grounded frame 306, or to nothing.

In the illustrated embodiment, the first solar cell 301 has a lead connecting its n-type semiconductor 324 to a negative solar module pole 330. The negative solar module pole 330 is connected to a negative solar module terminal 330 of the discharge controller 314. Switchable connections within the discharge controller 314 can connect or disconnect a conductive path between the negative solar module terminal 330 and a negative string bus terminal 322. The negative string bus terminal can be connected to the string bus 310. Thus, the discharge controller 314 can control whether the n-type semiconductor 322 of the first solar cell 301 is connected to the string bus 310, the grounded frame 306, or to nothing.

A "switchable connection" is a portion of a conductive pathway that can rapidly adjust the current passing through it based on an external input. Non-limiting examples include mechanical switches and transistors. The external input for a mechanical switch may be a physical force such as a human hand or a servo. The external input for a transistor may be an electrical signal applied to the gate of the transistor.

The discharge controller 314 may also include a grounded frame terminal 334. The grounded frame terminal 334 may be connected to the grounded frame 306. The grounded frame terminal 334 enables the discharge controller 314 to connect either of the positive or negative solar module poles 330, 332 to the grounded frame 306. By doing so, charge buildup/leakage in the solar module 308 (specifically in the side of the p-n junction adjacent to the transparent portion 340), can be discharged into ground 304. In an embodiment where there are leaked charges, those charges reside in and are removed from the n-type semiconductor 324 (if configured as illustrated). If the p-type semiconductor 324 is adjacent to the transparent portion 340 and faces the incident photons, then leaked charges reside in and are removed from the p-type semiconductor 322.

It should be understood that the leads from the first solar cell 301 and the second solar cell 302 can exit the solar module 308 with or without passing through the grounded frame 306 and/or the mounting insulator 328. While reference has been made to a first and second solar cell 301, 302, a solar module 308 can have any number of solar cells. The illustrated configuration is illustrative only, and the solar cells of the solar module 308 can be arranged and connected in any number of ways without departing from the spirit of the disclosure. While the lead from the n-type semiconductor 324 of the first solar cell 301 and the lead from the p-type semiconductor 322 of the second cell 302 exit the solar module 308 as illustrated, it should be understood that such leads can take any configuration or path imaginable. In an embodiment, the leads can be insulated from the grounded frame 306.

Figure 4:
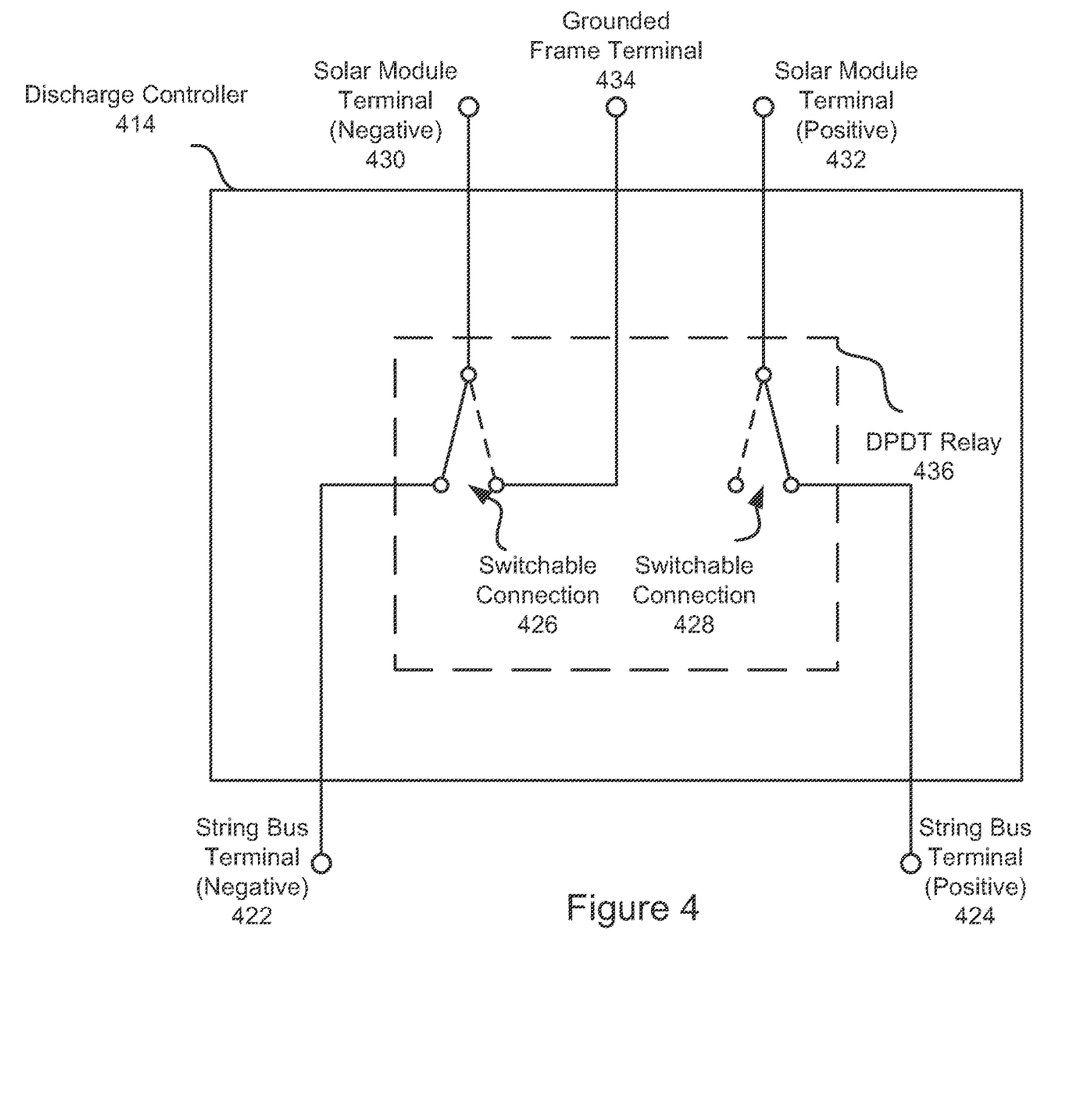
FIG. 4 illustrates an embodiment of a discharge controller.

FIG. 4 illustrates an embodiment of a discharge controller 414. The discharge controller 414 includes two solar module terminals: a negative solar module terminal 430 and a positive solar module terminal 432. The discharge controller 414 includes a grounded frame terminal 434. The discharge controller 414 includes two string bus terminals: a negative string bus terminal 422 and a positive string bus terminal 424. The discharge controller 414 includes two switchable connections 426, 428. Optionally, the discharge controller 414 can include a double-pole double-throw relay 436, which may include the two switchable connections 426, 428.

The negative solar module terminal 430 may be connected to the negative solar module pole 330 of the solar module 308. The positive solar module terminal 432 may be connected to the positive solar module pole 332 of the solar module 308. These terminals 430, 432 can be temporarily connected or permanently connected. A permanent connection may include, for example a soldered connection between the solar module poles 330, 332 and the solar module terminals 430, 432. A permanent connection may also include, for example, a manufactured seamless connection.

When providing energy to the string bus 310, the solar module terminals 430, 432 are connected to the corresponding string bus terminals 422, 424 via the switchable connections 426, 428. The closed state of the switchable connections is illustrated via a solid line while the open state is illustrated via a dashed line. In this configuration current from the string bus 310 passes through the solar module 308, and voltage generated by the solar module 308 is provided to the string bus 310. For instance, in the illustrated embodiment, the switchable connection 426 connects the negative solar module terminal 430 to the negative string bus terminal 422, and the switchable connection 428 connects the positive solar module terminal 432 to the positive string bus terminal 424.

Periodically, the discharge controller 414 can discharge charge buildup/leakage in the solar module 308 into the ground 304. To do this, the discharge controller 414 can disconnect the solar module 308 from the string bus 310 and connect one of the poles 330, 332 of the solar module 308 to the grounded frame 306 and hence to ground 304. When both solar module poles 330, 332 are disconnected from the string bus 310, the switchable connections 426, 428 are in an open state (dashed lines).

When the solar module poles 330, 332 are disconnected from the string bus 310, the switchable connections 426, 428 connect one of the solar module poles 330, 332 to the grounded frame 306 via the grounded frame terminal 434. In the illustrated embodiment, the negative solar module pole 330 may be connected to the grounded frame 306 via the switchable connection 426. As such, the solar cells 301 and the grounded frame 306 may be connected and hence the solar cells 301, 302 may be grounded. In the illustrated embodiment, there is no connection between the switchable connection 428 and the grounded frame terminal 434. In another embodiment, the positive solar module terminal 432 may be connected to the grounded frame 306 via the switchable connection 428. In such an embodiment, there may not be a connection between the switchable connection 426 and the grounded frame terminal 434.

In an embodiment, the solar cells 301, 302 can be simultaneously disconnected from the string bus 310 and connected to the grounded frame 306. In another embodiment, this can be a two-stage process where the solar cells 301 are first disconnected from the string bus 310, and subsequently connected to the grounded frame 306.

In an embodiment, the switchable connections 426, 428 may include resistive elements (e.g., resistor) or may be connected in series with a resistive element in order to help with discharge and safe operation (e.g., avoid arcing of a switch).

The switchable connections 426, 428 can include one or more switches. For instance, the switchable connection 426 may include a first switch configured to connect and disconnect the negative solar module terminal 430 and the negative string bus terminal 424, and a second switch configured to connect the negative solar module terminal 430 and the grounded frame terminal 434.

The switchable connections 426, 428 can be either mechanical or electronic (e.g., transistors). One or more controllers (not illustrated) may be configured to control the switchable connections 426, 428 (e.g., via control signals sent to gates of transistors). In an embodiment, the switchable connections 426, 428 may be a part of a double-pole double-throw (DPDT) relay 436. A DPDT relay is a pair of switchable connections that switch in unison. Switching can be initiated via a single input. The DPDT relay 436 in FIG. 4 has two states: closed (solid lines) and open (dashed lines).

In the closed state, the solar module terminals 430, 432 are connected to the string bus terminals 422, 424 and the solar module 308 provides energy to the string bus 310. In the open state, the solar module terminals 430, 432 are disconnected from the string bus terminals 422, 424 and the solar module 308 cannot provide energy to the string bus 310. Instead, the negative solar module terminal 422 is connected to the grounded frame terminal 434. Thus, charge buildup/leakage in the solar module 308 can be discharged into the ground 304 when the switchable connections 426, 428 are in the open state. When the switchable connections 426, 428 are in the open state, the positive solar module terminal 424 may not be connected to anything. The switchable connections 426, 428 remain in the open state for a minimum time in order to minimize the time that the solar module 308 is not providing energy to the string bus 310.

It should be understood that FIG. 4 is illustrative only, and that the configuration of connections between the grounded frame terminal 434 and the switchable connections 426, 428 can be reversed. For example, in the open state, the switchable connection 428 may connect the positive solar module terminal 432 to the grounded frame terminal 434, and the negative solar module terminal 430 could be disconnected from everything.

Figure 5:
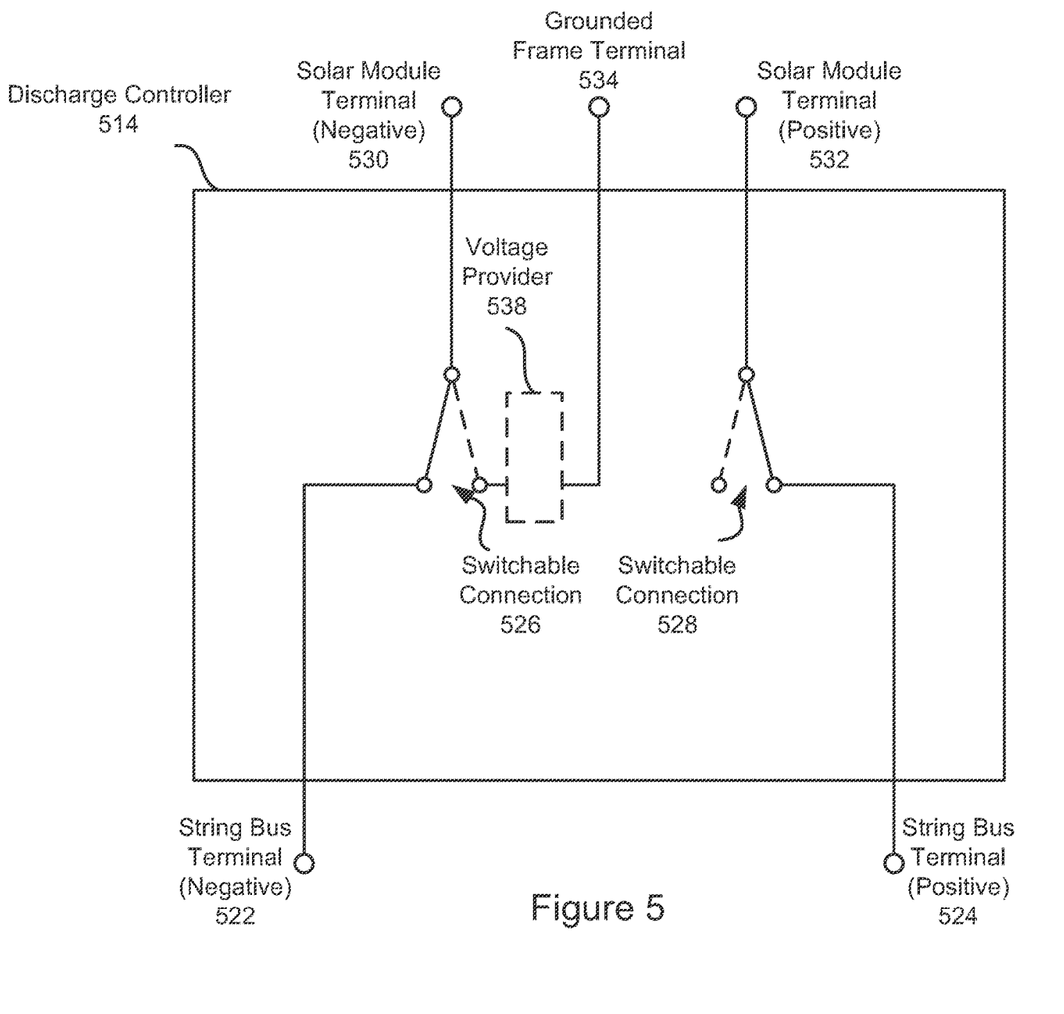
FIG. 5 illustrates an embodiment of a discharge controller having a voltage provider.

FIG. 5 illustrates an embodiment of a discharge controller 514 having a voltage provider 538. The discharge controller 514 is similar to that illustrated in FIG. 4, but with the addition of the voltage provider 538. The voltage provider 538 is a device configured to change the potential difference between one of the solar module poles 330, 332 and the grounded frame terminal 534. In the illustrated embodiment, the voltage provider 538 changes the potential difference between the negative solar module terminal 530 and the grounded frame terminal 534. In another embodiment (not illustrated), the voltage provider 538 can be located between the grounded frame terminal 538 and the switchable connection 528 such that the voltage provider 538 can change the potential difference between the positive solar module terminal 532 and the grounded frame terminal 534. The voltage provider 538 can increase or decrease the potential difference between the grounded frame terminal 534 and either of the solar module terminals 530, 532 (depending on its location). Non-limiting examples of a voltage provider are a capacitor and a battery.

The purpose of the voltage provider is to increase the potential difference between the solar cells 301, 302 and the transparent portion 340 of the grounded frame 306. By increasing this potential, charge buildup/leakage can be more quickly discharged into ground 304. The idea is similar to discharging a capacitor. When a capacitor is connected in series with a resistance and ground in a loop, the capacitor discharges. However, the discharge time can be decreased if a voltage source is also added in series, and the voltage source is opposite in polarity to the voltage source used to charge the capacitor. Similarly, here the voltage provider 538 can be connected in series with the capacitive-like circuit (the transparent portion and the solar cells), in order to more quickly discharge the charge buildup/leakage.

The illustrated configuration of the voltage provider 538 and switchable connections 526, 528 is illustrative only. For instance, the voltage provider 538 and a switchable connection may be configured in parallel with another switchable connection. This parallel configuration coupled between the string bus 310, the grounded frame terminal 534, and one of the solar module terminals 530, 532 enables the discharge controller 514 to select whether a connection is made directly from the solar cells 301, 302 to ground 304 or whether such a connection is made through the voltage provider 538. In other words, such a configuration would allow the solar module poles 330, 332 to be connected to the grounded frame 306 and discharge charge buildup/leakage either with or without the assistance of the voltage provider 538.

Figure 6:
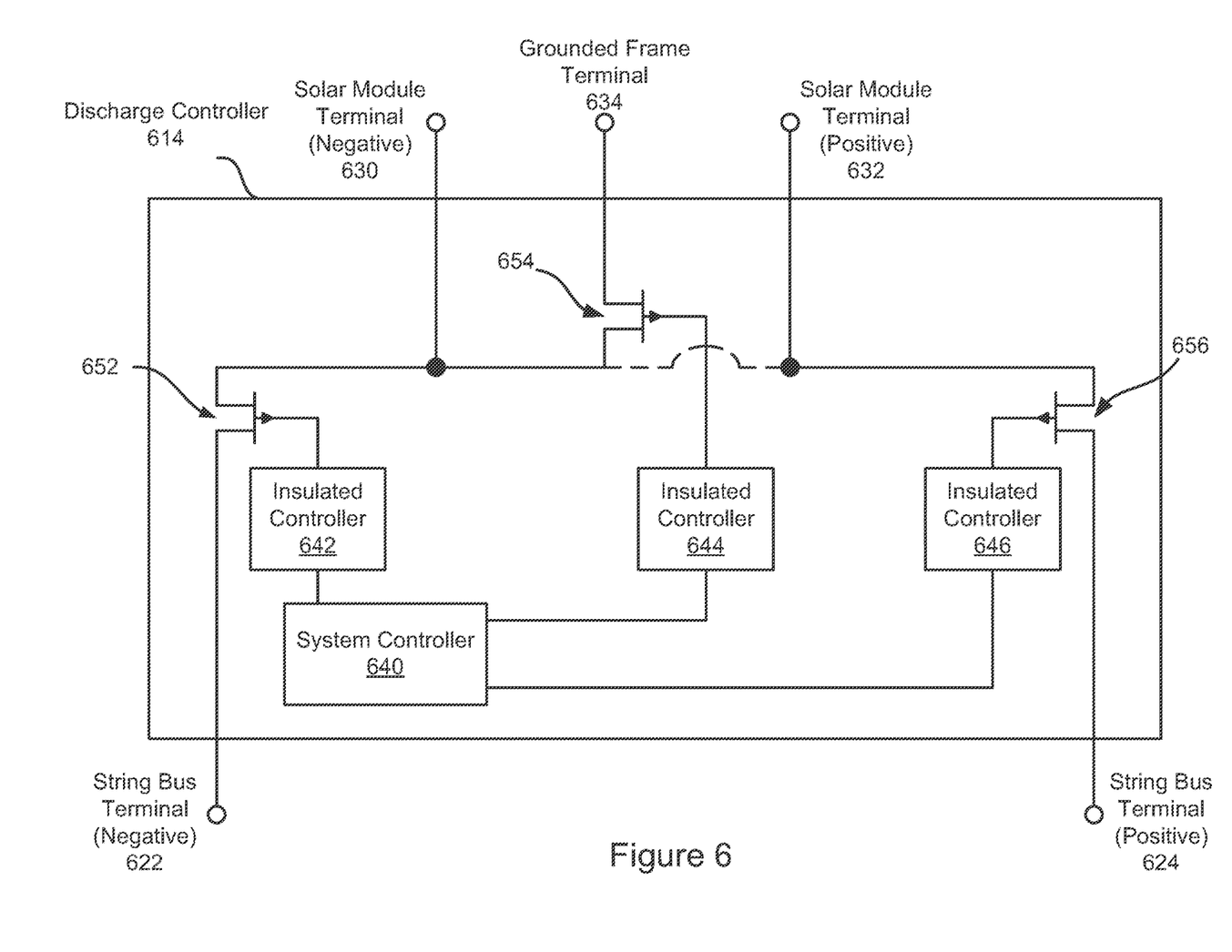
FIG. 6 illustrates an embodiment of a discharge controller having a plurality of switchable connections and a plurality of controllers.

FIG. 6 illustrates an embodiment of a discharge controller 614 having a plurality of switchable connections 652, 654, 656 and a plurality of controllers 640, 642, 644, 646. In this embodiment, the discharge controller 614 has identical terminals 622, 624, 630, 632, 634 to the discharge controllers 614 illustrated in FIGS. 4 and 5. However, the discharge controller 614 includes a first switchable connection 652 configured to connect/disconnect the negative solar module terminal 630 to/from the negative string bus terminal 622. The discharge controller 614 includes a second switchable connection 654 configured to connect/disconnect either solar module terminal 630, 632 to/from the grounded frame terminal 634. The discharge controller 614 includes a third switchable connection 656 configured to connect/disconnect the positive solar module terminal 632 to/from the positive string bus terminal 624.

The discharge controller 614 includes a system controller 640. The system controller 640 can control a first, second, and third, insulated controller 642, 644, 646. The first, second, and third insulated controllers 642, 644, 646 control the first, second, and third switchable connections 652, 654, 456, respectively.

The first and third switchable connections 652, 656 are configured to connect/disconnect the solar module 308 from the string bus 310. When the first and third switchable connections 652, 656 are open, the solar module terminals 630, 632 are disconnected from the string bus terminals 622, 624. The first and third switchable connections 652, 656 may be opened in order to allow charge buildup/leakage in the solar module 308 to be discharged. The first and third switchable connections 652, 656 can therefore be opened periodically, but not so often that the energy production of the solar array is significantly decreased.

The second switchable connection 654 is configured to connect/disconnect the solar cells 301, 302 to/from the grounded frame 306. When the second switchable connection 654 is open, neither the negative nor positive solar module terminals 630, 632 are connected to the grounded frame terminal 634. When the second switchable connection 654 is closed, either the negative or positive solar module terminal 630, 632 (depending on whether the negative or positive solar module terminal 630, 632 is connected to the second switchable connection 654) is connected to the grounded frame terminal 634. Only one of the negative or positive solar module terminals 630, 632 is connected to the second switchable connection 654. This connection can be permanent (e.g., soldering, or some other manufacturing connection) or temporary (e.g., manual connection via banana plug). In the illustrated embodiment, the negative solar module terminal 630 is connected to the second switchable connection 654. In an alternative configuration, the dotted line may be connected and the solid line between the negative solar module terminal 630 and the second switchable connection 654 may be disconnected.

The first switchable connection 652 may be controlled by the first insulated controller 642. The second switchable connection 654 may be controlled by the second insulated controller 644. The third switchable connection 656 may be controlled by the third insulated controller 646. The insulated controllers 642, 644, 646 may be controlled by a system controller 640. The system controller 640 can be a stand-alone unit or may be part of a general local management unit (LMU). By insulated, it is meant that the insulated controllers 642, 644, 646 are floating relative to ground 304. In other words, they are galvanically separated from the system controller 640. The insulated controllers 642, 644, 646 are also insulated from the system controller 640. In an embodiment, the switchable connections 654, 654, 656 can be controlled by a single controller.

The switchable connections 652, 654, 656 are illustrated as transistors, although mechanical switches or other types of electrical switches are also possible (e.g., MOSFET, IGBT, Bipolar). The first and third switchable connections 652, 656 can be bi-polar transistors. In an embodiment, one or more of the switchable connections 652, 654, 656 can be bi-polar transistors since bi-polar transistors may minimize current leakage such that there are no problems with a GFI or AFI in the junction box 203, should a junction box 203 be included. The first and third switchable connections 652, 656 can comprise a single transistor or a pair of anti-polar transistors. The switchable connections 652, 654, 656 can have short switching times (e.g., on the order of microseconds or milliseconds, to name two). Short switching times allow charge buildup/leakage to be discharged from the solar module 308 while only preventing energy from being provided to the string bus 310 for short periods of time.

In an embodiment, the discharge controller 614 includes a bypass circuit (not illustrated). The bypass circuit enables the positive and negative ends of the string bus 310 (the portions of the string bus 310 that connect to the positive and negative string bus terminals 622, 624) to be connected such that current continues to pass along the string bus 310 even when the solar module 308 is disconnected from the string bus 310.

Figure 7:
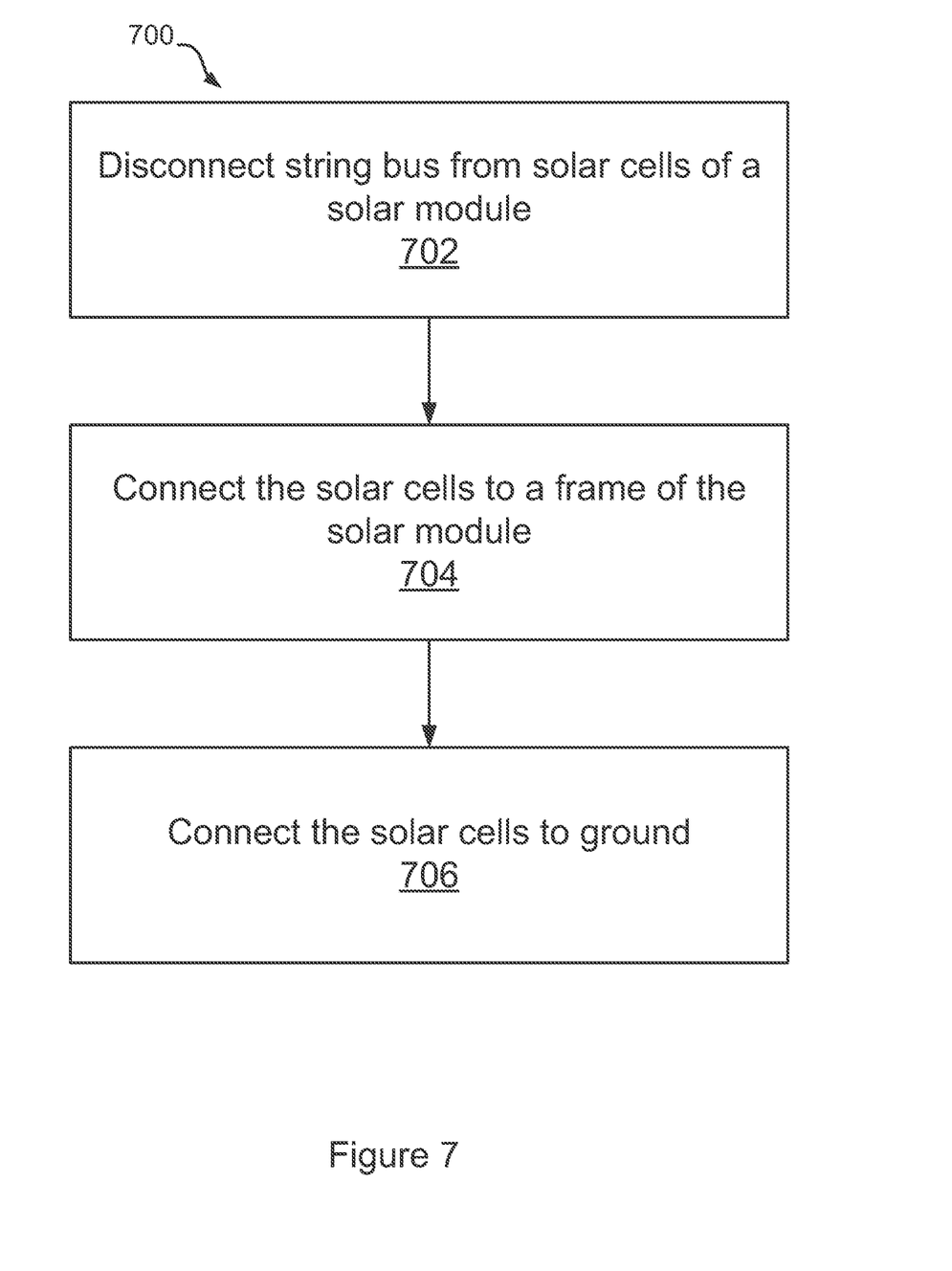
FIG. 7 illustrates a method for mitigating charge buildup/leakage in a solar module.

FIG. 7 illustrates a method for mitigating charge buildup/leakage in a solar module 308. The method 700 includes a disconnect operation 702 wherein, the string bus 310 is disconnected from the solar cells 301, 302 of the solar module 308. The method 700 includes a first connect operation 704 wherein, the solar cells 301, 302 are connected to a frame of the solar module 308. The method 700 includes a second connect operation 706 wherein, the solar cells 301, 302 are connected to ground 304.

While previous descriptions in this disclosure have used the term "grounded frame," the method 700 purposefully uses the unmodified term "frame" to allow for the possibility that the solar module frame is not grounded. This is not to say that in an embodiment, the frame cannot be grounded.

The three operations 702, 704, 706 of the method 700 may be carried out periodically. For instance, every ten seconds, the method 700 may be carried out. The three operations 702, 704, 706, may operate in less than one second, for example, and then a ten second pause can occur before the method 700 is carried out again. If a bypass circuit is not used, then it may be preferable to maximize the time between loops of the method 700 and minimize the time that the method 700 operates. This minimizes the time that energy is not being provided to the string bus 310 and minimizes the time that energy is not being passed down the string bus 310 since it is open. If a bypass circuit is used, then maximizing the time between loops of the method 700 and minimizing the time that the method 700 operates is not as important.

The disconnect operation 702 uses one or more switchable connections to disconnect one or both poles 330, 332 of the solar module 308 from the string bus 310. In effect, disconnecting the poles 330, 332 disconnects the solar cells 301, 302 from the string bus 310. Hence, the solar module 308 is isolated from the string bus 310 and can be grounded without impinging on operation of the string bus 310 or the load that the string bus 310 provides energy to. The switchable connections can be a part of a discharge controller 314. In an embodiment, the disconnect operation 702 operates before the connect operations 704, 706. In an embodiment, all three operations 702, 704, 706 operate simultaneously.

The first connect operation 704 uses one or more switchable connections to connect one of the solar module poles 330, 332 to the frame of the solar module 308. The switchable connections can be a part of a discharge controller 314. In an embodiment, the first connect operation 704 operates before the second connect operation 706. In an embodiment, the first and second connect operations 704, 706 operate simultaneously.

The second connect operation 706 uses one or more switchable connections to connect one of the poles 330, 332 of the solar module 308 to the ground 304. If the frame is grounded, then this operation 706 is not needed. The solar module pole 330, 332 that is connected to the ground 304 is preferably that solar module pole 330, 332 which is connected to the part of the solar cells 301, 302 (p-type or n-type) that is adjacent to the transparent portion 340 of the frame.

It is clear that many modifications and variations of these embodiments may be made by one skilled in the art without departing from the spirit of the novel art of this disclosure. For example, a bypass circuit may be implemented to allow current to pass solar modules 308 that are disconnected from the string bus 310. In other words, when the discharge controller 314 has disconnected a solar module 308 from the string bus 310 to discharge charge buildup/leakage in the solar module 308, a bypass circuit can ensure that current continues to flow along the string bus 310 and to the load. Without a bypass circuit, energy generation may be halted every time that charge buildup/leakage from a solar module 308 is discharged. The bypass circuit can be a part of the discharge controller 314. Alternatively, the bypass circuit can be a device external to the discharge controller 314. These modifications and variations do not depart from the broader spirit and scope of the invention, and the examples cited herein are to be regarded in an illustrative rather than a restrictive sense.

What is claimed is:

1. A solar module, comprising:
   a frame pole for connecting to ground;
   a positive pole;
   a negative pole; and
   a plurality of solar cells disposed within the frame and connected between the positive pole and the negative pole;
   the solar module having:
   a first mode to remove an electric field buildup on the solar module, and
   a second mode to provide electricity produced by the solar cells onto a string bus;
   wherein in the first mode:
   the solar cells disconnected from the string bus;
   the positive pole and the negative pole connected to the frame of the solar module; and
   the solar cells connected to the ground;
   wherein in the second mode:
   the positive pole and the negative pole disconnected from the frame of the solar module;
   the solar cells disconnected from the ground; and
   the solar cells connected to the string bus.

2. The solar module of claim 1, wherein a ratio of time period between the first mode and the second mode is such that loss of power generated by the solar cells due to the first mode is less than loss of power due to the electric field buildup during the second mode.

3. The solar module of claim 1, wherein the electric field buildup includes charges leaked into the solar cells.

4. The solar module of claim 1, wherein the electric field buildup includes charges in dust deposited on a transparent cover over the solar cells.

5. A solar generation unit, comprising:
a solar module, comprising:
a frame;
a positive pole;
a negative pole; and
a plurality of solar cells; and
a discharge controller coupled between the solar cells and a string bus;
wherein during production of electricity by the solar module, the discharge controller is configured to alternate between:
a first mode to remove an electric field buildup on the solar module, and
a second mode to provide electricity produced by the solar cells onto the string bus;
wherein in the first mode, the discharge controller is configured to:
disconnect the solar cells from the string bus;
connect the positive pole and the negative pole to the frame of the solar module; and
connect the solar cells to the ground;
wherein in the second mode, the discharge controller is configured to:
disconnect the positive pole and the negative pole from the frame of the solar module;
disconnect the solar cells from the ground; and
connect the solar cells to the string bus.

6. The solar generation unit of claim 5, wherein in the first mode, the discharge controller is further configured to provide a path bypassing the solar module in the string bus.

7. The solar generation unit of claim 6, wherein in the first mode, the discharge controller is further configured to apply a voltage potential between the frame and the solar cells.

8. The solar generation unit of claim 5, wherein a ratio of time period between the first mode and the second mode is such that loss of power generated by the solar cells due to the first mode is less than loss of power due to the electric field buildup during the second mode.

9. The solar generation unit of claim 5, wherein the electric field buildup includes charges leaked into the solar cells.

10. The solar generation unit of claim 5, wherein the electric field buildup includes charges in dust deposited on a transparent cover over the solar cells.

11. The solar module of claim 1, wherein in the first mode, the positive pole and the negative pole disconnected from the string bus, and the frame pole connected to the ground.

12. The solar module of claim 1, wherein in the second mode, the frame pole disconnected from the ground.

* * * * *